US011810345B1

(12) United States Patent
Gayaka et al.

(10) Patent No.: US 11,810,345 B1
(45) Date of Patent: Nov. 7, 2023

(54) SYSTEM FOR DETERMINING USER POSE WITH AN AUTONOMOUS MOBILE DEVICE

(71) Applicant: AMAZON TECHNOLOGIES, INC., Seattle, WA (US)

(72) Inventors: Shreekant Gayaka, San Jose, CA (US); Menghan Zhang, San Jose, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 164 days.

(21) Appl. No.: 17/449,898

(22) Filed: Oct. 4, 2021

(51) Int. Cl.
*G06V 20/10* (2022.01)
*G05D 1/00* (2006.01)
*G05D 1/02* (2020.01)
*G06T 7/70* (2017.01)
*G06V 10/94* (2022.01)
*G06V 10/98* (2022.01)
*G06V 40/10* (2022.01)
*G06V 40/16* (2022.01)

(52) U.S. Cl.
CPC ............ *G06V 20/10* (2022.01); *G05D 1/0088* (2013.01); *G05D 1/0251* (2013.01); *G06T 7/70* (2017.01); *G06V 10/95* (2022.01); *G06V 10/98* (2022.01); *G06V 40/10* (2022.01); *G06V 40/161* (2022.01); *G06T 2207/20084* (2013.01); *G06T 2207/30201* (2013.01)

(58) Field of Classification Search
CPC ...... G06V 20/10; G06V 40/10; G06V 40/161; G06V 10/98; G06V 10/95; G06T 7/70; G06T 2207/20084; G06T 2207/30201; G05D 1/0088; G05D 1/0251
See application file for complete search history.

(56) References Cited

U.S. PATENT DOCUMENTS

| 2016/0210503 | A1* | 7/2016 | Yin ........................... G06T 7/73 |
| 2019/0077007 | A1* | 3/2019 | Mallinson ............. A61B 5/1118 |
| 2020/0050206 | A1* | 2/2020 | Deyle ................ G01C 21/3461 |
| 2021/0104100 | A1* | 4/2021 | Whitney ................. G06F 3/011 |
| 2021/0136292 | A1* | 5/2021 | Hoch ................... H04N 23/611 |
| 2022/0207259 | A1* | 6/2022 | Zhang ....................... G06T 7/73 |

OTHER PUBLICATIONS

Felipe Echeverri Guevara, Andres, "Kalman Filter. A way to detect and remove outliers", Medium, The Yuxi Blog, Nov. 15, 2019, 15 pgs. Retrieved from the Internet: URL: https://medium.com/blogyuxiglobal/kalman-filter-the-way-to-remove-outliers-bb6aa616788e.

* cited by examiner

*Primary Examiner* — Syed Haider
(74) *Attorney, Agent, or Firm* — Lindauer Law, PLLC

(57) ABSTRACT

An autonomous mobile device (AMD) that interacts with a user operates more effectively with reliable information about that user's pose. Occlusion due to obstacles or sensor field-of-view limits may prevent a sensor from "seeing" a user's torso or lower body while the face may remain visible. Face orientation alone produces unreliable results because a user frequently moves their head. Sensor data is acquired over time and used to determine face and body poses, with each pose representing a location and orientation in physical space of that portion of the user. A transform is determined that represents the relative arrangement of a face pose and a body pose at a particular time. If available, the body pose may be used as the user's pose. If the body pose is unavailable or unreliable at a given time, it may be inferred by applying the previously determined transform to the current face pose.

20 Claims, 7 Drawing Sheets

SYSTEM FOR DETERMINING USER POSE WITH AN AUTONOMOUS MOBILE DEVICE

BACKGROUND

Every day, a user faces a variety of tasks both personal and professional that need to be attended to. These may include helping in the care of others, such as children or the elderly, working from home, taking care of the home, staying in contact with others, and so forth. Devices that assist in these tasks may help the user perform these tasks better or may allow the user time to attend to other tasks.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
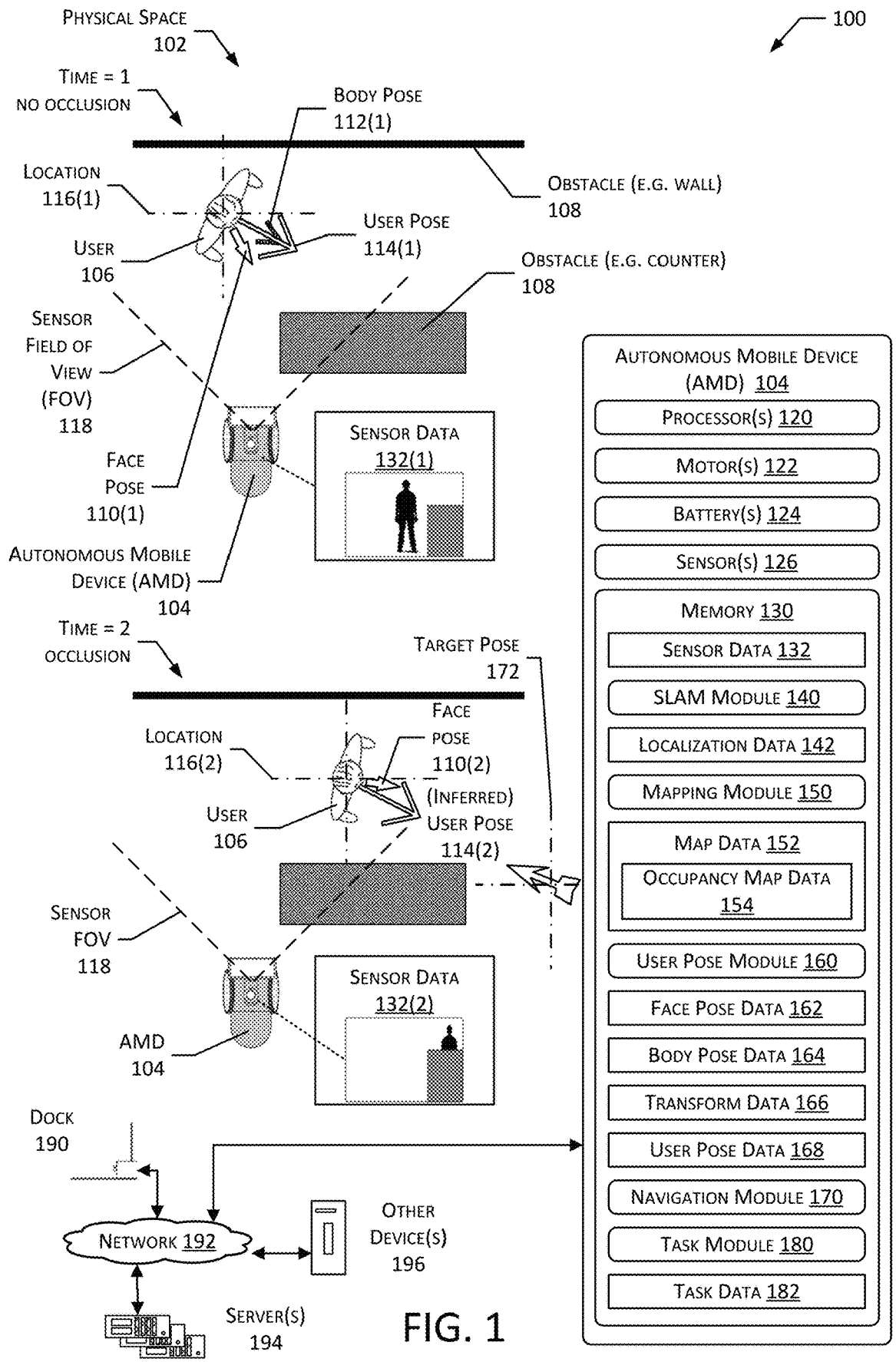
FIG. 1 illustrates a system for an Autonomous Mobile Device (AMD) to determine a user pose, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

An autonomous mobile device (AMD) is capable of autonomous movement from one location in a physical space to another location without being controlled by a user. A user may interact with the AMD and the AMD may perform tasks that involve moving in the physical space, displaying information, accepting input, and so forth. The AMD may be operated responsive to how the user is oriented. For example, if the AMD has a message to deliver to the user, it may move in front of the user. However, in order to move in front of the user, the AMD needs information about a user pose: where the user is, and which way the user is pointing in the physical space.

Traditional systems may generate incorrect user pose data if sensor data is occluded by intervening obstacles or if part of the user is partially outside of a field of view (FOV) of a sensor. For example, an image based system may be unable to produce user pose data or may produce incorrect user pose data if a user is standing behind a kitchen counter that obscures part of the body of the user. Occlusion may also be more likely to occur given the size of the robot and placement of the sensors. For example, the view from a camera 30 centimeters (cm) above the ground is more likely to be an obscured view than if the camera is 2 meters above the ground. Even with elevated sensor placement, occlusion still is problematic as users and the AMD move through the physical space that contains various obstacles such as furniture, plants, pets, and so forth. In another example, as the AMD approaches the user, depending upon the size of the FOV, tilt of the camera, distance to the user, and so forth, part of the user's body may be outside of the FOV. As with occlusion, the absence of part of the user in the resulting image data may impair determination of the user pose data.

To try and minimize the adverse effects of occlusion or the user being partially outside of the FOV, traditional systems have attempted to resolve this issue by using orientation based on the face of the user. However, face orientation alone produces unreliable results for several reasons. Face orientation fails if the face is not visible, such as if the user is presenting the back of their head to the sensor. Face orientation is highly variable as a user will frequently and quickly move their head. Face orientation can vary significantly from the overall orientation of the user, such as when a user turns their head to the left while walking forward.

Described in this disclosure are techniques and a system to determine user pose, even if part of the body of the user is occluded from, or outside of, view of a sensor. Sensor data, such as image data from a camera, point cloud data from a LIDAR, and so forth, are processed to determine face pose data and body pose data. Face pose data is indicative of a location and orientation in the physical space of the face of the user as depicted in the sensor data. Body pose data is indicative of a location and orientation in the physical space of the body of the user as depicted in the sensor data. A transform determined that describes the spatial relationship between the location of the body pose and the location of the face pose.

At a first time, a first frame of sensor data depicts the user with face and body visible (un-occluded). First face pose data, first body pose data, and a first transform are determined. As this information is available, the first body pose data may be used as the user pose data.

At a second time, a second frame of sensor data depicts the user with the face visible, but the rest of the body of the user is at least partially occluded. As a result, second face pose data may be determined, but body pose data is not available. In one implementation, the system may use the second face pose data and the first transform to determine inferred user pose data. For example, the second face pose data specifies a face location in the physical space. The face location is provided as an input to the transform to determine an inferred body location in the physical space. The orientation data of the first body pose data may then be translated to the inferred body location, with the result being inferred body pose data.

In another implementation, orientation data from the second face pose data may be used to modify at least some of the orientation data of the first body pose data, to determine orientation of the inferred body pose data. For example, it is biomechanically infeasible for a human to turn their head 180 degrees independently of their torso. If the second face pose data indicates a change in orientation that is greater than a threshold value, such as 100 degrees, the orientation specified by the first body pose data as used in the inferred body pose data may be modified. For example, the modified orientation may be an average of the orientation values between a first orientation of the first body pose data and a second orientation of the second face pose data.

In some implementations, the face pose data and the body pose data may be determined by processing raw pose data from other systems using Kalman filters. For example, raw face pose data and raw body pose data may be determined using previously trained neural networks.

Determination of the inferred user pose may be responsive to a determination of an error. In one implementation, an error may be determined if a distance between a face pose and a body pose is greater than a threshold value. In another implementation, if successive output from the respective Kalman filters varies by more than a threshold amount, an error may be deemed to have occurred. In yet another implementation, if body pose data is associated with a confidence value that is less than a threshold, an error may be deemed to have occurred.

Once a user pose has been determined, the AMD may be operated based on this information. For example, if the user summons the AMD to "come here", the AMD may use the user pose to determine where the user is located, and where the front of the user is. Based on this information, a target pose may be determined that places the AMD at a location in front of the user, and oriented towards the user. In another example, if the user orders the AMD to "follow me", the AMD may use the user pose to determine where the user is located, where the back of the user is, and select a target pose that is behind the user.

By using the techniques described in this disclosure, user pose may be reliably estimated, even if part of the body of the user is occluded or outside of the sensor FOV. As a result, the AMD is better able to determine where the user is, and which way the user is pointing, allowing for improved interactions.

The system is computationally efficient, allowing for execution with extremely low latency using minimal compute resources. This allows for execution on relatively inexpensive hardware, while providing low latency that improves user experience.

Illustrative System

FIG. 1 illustrates a system 100 for an autonomous mobile device (AMD) 104 to determine a user pose, according to some implementations.

A physical space 102 includes an autonomous mobile device (AMD) 104. The physical space 102 may be one or more floors within a residence, office, vessel, and so forth. The AMD 104 may be configured to dock or connect to a dock 190. The dock 190 may provide external power which the AMD 104 may use to charge a battery 124 of the AMD 104.

The physical space 102 may include various obstacles 108 such as walls, furniture, toys, ledges, or stairs that the AMD 104 is unable to traverse, may occlude sensor operation, and so forth. In this illustration, the obstacles 108 include a wall and a counter.

A pose is indicative of a location and orientation within the physical space 102. For example, pose data may be specified as coordinates of (+1.1, 2.3, 1.1, 37°, 12°, 301°). The coordinates may be specified with respect to an origin. The physical location may be relative to an origin point, while orientation may be relative to a reference direction. The six coordinate values comprise a coordinate value of +1.1 meters (m) along an X-axis, a coordinate value of 2.3 m along a Y-axis, a coordinate value of 1.1 m along a Z-axis, and a coordinate value indicating rotation with respect to each of the axes, such as an orientation of 301 degrees relative to a specified direction with respect to rotation about a Z-axis. A Z-axis coordinate value may be indicative of a height value or elevation value. A horizontal plane may be defined by the X and Y axes.

In this illustration, a user 106 is present in the physical space 102. The physical space 102 is shown at a first time t=1 and a second time t=2. Various poses may be attributed to the user 106 at a given time. A face pose 110 is associated with the face of the user 106 at the given time. A body pose 112 is associated with the body of the user 106 at the given time. The face pose 110 may differ from the body pose 112. For example, the user 106 may turn their head to the right of a centerline described by their body. A user pose 114 may be attributed to the user 106. In some implementations, the user pose 114 may comprise the body pose 112.

The AMD 104 includes one or more sensors 126. As discussed below, the sensors 126 may have a sensor field of view (FOV) 118. Sensor data 132 may be acquired for the volume within the sensor FOV 118.

At the first time t=1, the user 106 is at a first location 116(1). The user 106 is within the sensor FOV 118 and is not occluded by any intervening obstacles 108. In this illustration, the sensor 126 comprises a camera 344, and sensor data 132(1) associated with the first time t=1. The user 106 is fully in view at time t=1.

At the second time t=2, the user 106 has moved and now is at a second location 116(2). The user 106 is within the sensor FOV 118, but is now partially occluded by an intervening obstacle 108 (e.g., the counter). This is shown with the sensor data 132(2). As described below, the user pose module 160 is able to determine an (inferred) user pose 114(2). Based on the (inferred) user pose 114(2), a target pose 172 may be determined.

The AMD 104 may include one or more hardware processors 120 (processors) configured to execute one or more stored instructions. The processors 120 may comprise one or more cores. The processors 120 may include microcontrollers, systems on a chip, field programmable gate arrays, digital signal processors, graphic processing units, general processing units, and so forth.

One or more motors 122 or other actuators enable the AMD 104 to move from one location in the physical space 102 to another. For example, a motor 122 may be used to drive a wheel attached to a chassis of the AMD 104, which causes the AMD 104 to move. The AMD 104 may turn, move forward, move backward, and so forth. In another example, actuators may move mechanical legs allowing the AMD 104 to walk.

The AMD 104 may include battery(s) 124 to provide electrical power for operation of the AMD 104. The battery 124 may be rechargeable, allowing it to store electrical energy obtained from an external source, such as the dock 190. In other implementations, a wireless power receiver may be used to provide power for operation of the AMD 104, recharge the battery 124, and so forth.

The AMD 104 may include one or more sensors 126. For example, the sensors 126 may include microphones, time-of-flight (TOF) sensors, cameras, LIDAR, inductive sensors, and so forth. The sensors 126 may generate sensor data 132. The sensors 126 are discussed in more detail with regard to FIG. 3.

The AMD 104 includes one or more memories 130. The memory 130 may comprise one or more non-transitory computer-readable storage media (CRSM). The memory 130 may store the sensor data 132 resulting from operation of the one or more sensors 126. The memory 130 may also store one or more modules.

A SLAM module 140 determines localization data 142. The localization data 142 is indicative of a pose of the AMD 104 in the physical space 102 at a particular time. The localization data 142 may be based on some external reference, such as features visible in the physical space 102, data from inertial sensors, and so forth. For example, a feature within an image may comprise a shadow, edge of a door frame depicted in the image, and so forth.

During operation, the AMD 104 may determine localization data 142 that includes the pose data based on the sensor data 132. By knowing where the AMD 104 is, and which direction the sensors 126 of the AMD 104 are pointing, as provided by the localization data 142, the sensor data 132 may be used to determine information about where the obstacles 108 are in the physical space 102, where the users 106 are, and so forth. A set of poses generated over time may describe a given AMD 104 trajectory. For example, trajectory data may comprise a time series of pose data.

The AMD 104 may include a mapping module 150. The mapping module 150 determines map data 152 that may comprise one or more of feature data or occupancy map data 154. The feature data may comprise information about features visible from a particular pose. The occupancy map data 154 is a representation of the physical space 102 that includes obstacles 108 and their locations in the physical space 102.

The user pose module 160 determines user pose data 168 that is indicative of a user pose 114. The user pose module 160 may use sensor data 132 as input and determines one or more of face pose data 162, body pose data 164, or transform data 166. Based on one or more of the face pose data 162, the body pose data 164, or the transform data 166, the user pose module 160 determines the user pose data 168.

The user pose module 160 is discussed in more detail with regard to FIGS. 4-7. In brief, the user pose module 160 processes the sensor data 132 to determine face pose data 162 indicative of poses associated with a face of a user 106 and body pose data 164 indicative of poses associated with a body of the user 106. Transform data 166 is determined that is indicative of a spatial relationship between the locations in the physical space 102 specified by the body pose data 164 and the face pose data 162. The body pose data 164 may be used as the user pose 114. At a later time, if the body pose data 164 is unavailable or deemed to be in error, inferred body pose data 164 is determined by using the face pose data 162 associated with the later time, the previously determined transform data 166 and the previously determined body pose data 164. The (inferred) body pose data 164(2) may then be used for subsequent operation.

A navigation module 170 provides the AMD 104 with the ability to navigate within the physical space 102 without real-time human interaction. The navigation module 170 may use the occupancy map data 154 to determine a path along which the AMD 104 may move to reach a target pose 172. For example, the target pose 172 may a location that is in front of a user 106.

The AMD 104 may utilize one or more task modules 180. The task module 180 comprises instructions that, when executed, provide one or more functions. The task modules 180 may perform functions such as finding a user, following a user, presenting output on output devices of the AMD 104, performing sentry tasks by moving the AMD 104 through the physical space 102 to determine the presence of unauthorized people, and so forth. Tasks may be indicated by task data 182, and the task data 182 may be stored in a queue or some other memory structure within the memory 130.

The AMD 104 may use a network 192 to access one or more servers 194. The servers 194 may process data from the AMD 104. The servers 194 may send data to the AMD 104 that may be subsequently used to operate the AMD 104.

The AMD 104 may also communicate with other devices 196. The other devices 196 may include one or more devices that are within the physical space 102 such as a home or associated with operation of one or more devices in the physical space 102. For example, the other devices 196 may include a doorbell camera, a garage door opener, a refrigerator, washing machine, and so forth. In some implementations, the other devices 196 may include other AMDs 104, vehicles, and so forth.

Figure 2:
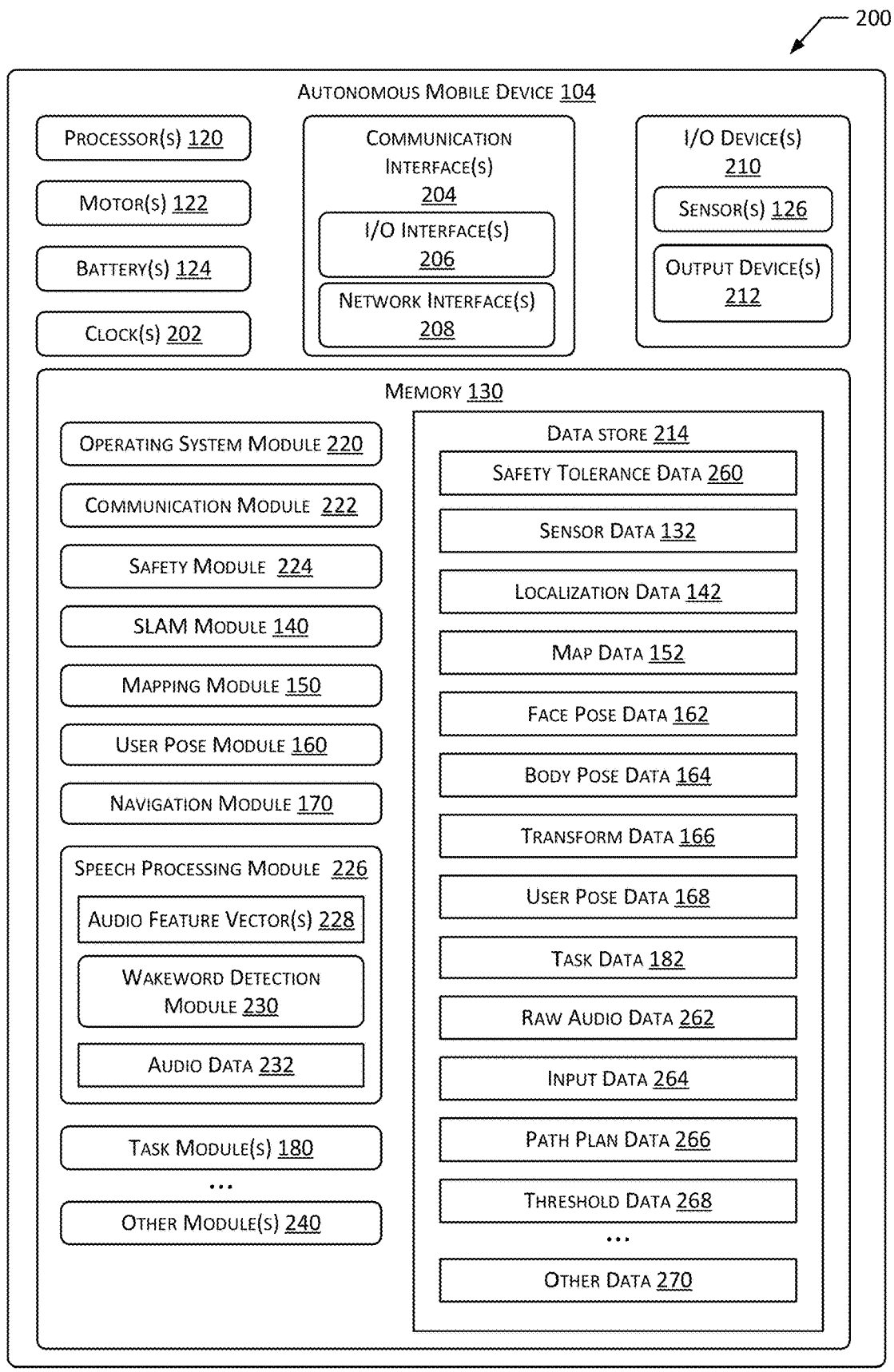
FIG. 2 is a block diagram of the components of the AMD, according to some implementations.

FIG. 2 is a block diagram 200 of the components of the AMD 104, according to some implementations.

As described, the AMD 104 may include one or more hardware processors 120 (processors) configured to execute one or more stored instructions. As described above, the AMD 104 may include one or more motors 122 or other actuators to enable the AMD 104 to move from one location in the physical space 102 to another.

The AMD 104 may include one or more batteries 124 to provide electrical power suitable for operating the components in the AMD 104. In some implementations other devices may be used to provide electrical power to the AMD 104. For example, power may be provided by wireless power transfer, capacitors, fuel cells, storage flywheels, and so forth.

One or more clocks 202 may provide information indicative of date, time, ticks, and so forth. For example, the processor 120 may use data from the clock 202 to associate a particular time with an action, sensor data 132, and so forth.

The AMD 104 may include one or more communication interfaces 204 such as input/output (I/O) interfaces 206, network interfaces 208, and so forth. The communication interfaces 204 enable the AMD 104, or components thereof, to communicate with other devices 196 or components. The communication interfaces 204 may include one or more I/O interfaces 206. The I/O interfaces 206 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 206 may couple to one or more I/O devices 210. The I/O devices 210 may include input devices such as one or more of a sensor 126, keyboard, mouse, scanner, and so forth. The I/O devices 210 may also include output devices 212 such as one or more of a motor 122, light, speaker, display, projector, printer, and so forth. The output devices 212 are discussed in more detail with regard to FIG. 3. In some embodiments, the I/O devices 210 may be physically incorporated with the AMD 104 or may be externally placed.

The network interfaces 208 may be configured to provide communications between the AMD 104 and other devices 196 such as other AMDs 104, the dock 190, routers, access points, and so forth. The network interfaces 208 may include devices configured to couple to personal area networks (PANS), local area networks (LANs), wireless local area networks (WLANS), wide area networks (WANs), and so forth. For example, the network interfaces 208 may include devices compatible with Ethernet, Wi-Fi, Bluetooth, Bluetooth Low Energy, ZigBee, and so forth. The AMD 104 may also include one or more buses or other internal communications hardware or software that allow for the transfer of data between the various modules and components of the AMD 104. The network interfaces 208 are discussed in more detail with regards to FIG. 3.

As shown in FIG. 2, the AMD 104 includes one or more memories 130. The memory 130 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 130 provides storage of computer-readable instructions, data structures, program modules, and other data for the operation of the AMD 104. Example functional modules are shown stored in the memory 130, although the same functionality may alternatively be implemented in hardware, firmware, or as a system on a chip (SoC).

The memory 130 may include at least one operating system (OS) module 220. The OS module 220 is configured to manage hardware resource devices such as the I/O interfaces 206, the I/O devices 210, the communication interfaces 204, and provide various services to applications or modules executing on the processors 120. The OS module 220 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; the Robot Operating System (ROS), and so forth.

Also stored in the memory 130 may be a data store 214 and one or more of the following modules. These modules may be executed as foreground applications, background tasks, daemons, and so forth. The data store 214 may use a flat file, database, linked list, tree, executable code, script, or other data structure to store information. In some implementations, the data store 214 or a portion of the data store 214 may be distributed across one or more other devices 196 including other AMDs 104, servers 194, network attached storage devices, and so forth.

A communication module 222 may be configured to establish communication with other devices 196, such as other AMDs 104, an external server 194, a dock 190, and so forth. The communications may be authenticated, encrypted, and so forth.

Other modules within the memory 130 may include a safety module 224, the SLAM module 140, the mapping module 150, the user pose modules 160, the navigation module 170, task modules 180, a speech processing module 226, or other modules 240. The modules may access data stored within the data store 214, including safety tolerance data 260, sensor data 132, localization data 142, map data 152, face pose data 162, body pose data 164, transform data 166, user pose data 168, task data 182, raw audio data 262, input data 264, path plan data 266, threshold data 268, other data 270, and so forth.

The safety module 224 may access the safety tolerance data 260 to determine within what tolerances the AMD 104 may operate safely within the physical space 102. For example, the safety module 224 may be configured to stop the AMD 104 from moving when an extensible mast of the AMD 104 is extended.

A feature is detectable by a sensor 126. For example, the sensors 126 may include cameras that acquire images of the physical space 102. These images are processed to determine feature data representative of the presence of features in the images, such as edges of doors, shadows on the wall, texture on the walls, and so forth. A descriptor is information that describes a particular feature or set of features. Various techniques such as a scale-invariant feature transform (SIFT), speeded up robust features (SURF), a trained convolutional neural network, and so forth may be used to characterize the features and generate the descriptors. For example, the descriptor may comprise data indicative of the feature with respect to 256 different dimensions.

The SLAM module 140 may provide as output a series of poses, each pose describing a location and rotations in the physical space 102. Each pose may be based, at least in part, on the apparent motion of observed features in the images. For example, from image to image at least some of the features that are described by descriptors will be in common. By determining the relative difference in apparent position in the image of the same feature as observed by two different cameras at the same time, the location of the camera with respect to the feature in the physical space 102 may be determined. At successive times, and as the AMD 104 moves and additional images are determined from locations in the physical space 102, the apparent change in position of the same feature across the additional images may be used to determine subsequent poses. In some implementations, an orientation may comprise information about six dimensions (6D), that of three orthogonal axes and corresponding rotations about those axes.

The SLAM module 140 may also use data from other sensors 126 such as motor encoders, inertial measurement units (IMU) with one or more accelerometers and gyroscopes, and so forth. For example, the IMU may generate inertial data indicative of rotations or accelerations along particular axes. This inertial data may be integrated to provide information about the movement of the AMD 104.

While the AMD 104 is operating, the sensors 126 may be used to determine sensor data 132 comprising information about the physical space 102. During operation, the mapping module 150 uses the sensor data 132 from various sensors 126 and the localization data 142 to determine information such as where the AMD 104 is, how far the AMD 104 has moved, the presence of obstacles, where those obstacles are, and so forth. For example, the sensors 126 may comprise a time-of-flight (TOF) depth camera, ultrasound, radar, and so forth. Depth data from these sensors 126 may be indicative of whether an obstacle 108 is detected or not and includes information about the distance between the sensor 126 and the obstacle 108 and a relative direction, with respect to the sensor 126, of a detected obstacle 108. Sensor data 132 from cameras, LIDAR, or other devices may be processed by the SLAM module 140 to provide localization data 142. Based on this data, the mapping module 150 may determine the map data 152, such as the occupancy map data 154. The occupancy map data 154 represents the physical space 102. For example, the occupancy map data 154 may indicate the location of the obstacles 108.

The physical space 102 may be represented by map data 152 that may comprise a plurality of individual maps. The maps may comprise feature data, occupancy map data 154, and so forth. For example, each floor of a building may be expressed as different feature data and occupancy map data 154.

The user pose module 160 may determine the user pose data 168. Operation of the user pose module 160 is discussed in more detail with regard to FIGS. 4-7.

The navigation module 170 provides the AMD 104 with the ability to navigate within the physical space 102 without real-time human interaction. The navigation module 170 may use the map data 152 to determine a set of possible paths along which the AMD 104 may move to reach a target pose 172. One of these paths may be selected and used to determine path plan data 266 indicative of a path. For example, a possible path that is the shortest or has the fewest turns may be selected and used to determine the path. The path is then subsequently used to determine a set of commands that drive the motors 122 connected to the wheels. For example, the navigation module 170 may use the localization data 142 to determine the current location within the physical space 102 and determine path plan data 266 that describes the path to the target pose 172.

The speech processing module 226 may be used to process utterances of the user 106. Microphones may determine audio in the presence of the AMD 104 and may send raw audio data 262 to an acoustic front end (AFE). The AFE may transform the raw audio data 262 (for example, a single-channel, 16-bit audio stream sampled at 16 kHz), determined by the microphone, into audio feature vectors 228 that may ultimately be used for processing by various components, such as a wakeword detection module 230, speech recognition engine, or other components. The AFE may reduce noise in the raw audio data 262. The AFE may also perform acoustic echo cancellation (AEC) or other operations to account for output audio data that may be sent to a speaker of the AMD 104 for output. For example, the AMD 104 may be playing music or other audio that is being received from a network 192 in the form of output audio data. To avoid the output audio interfering with the device's ability to detect and process input audio, the AFE or other component may perform echo cancellation to remove the output audio data from the input raw audio data 262, or other operations.

The AFE may divide the raw audio data 262 into frames representing time intervals for which the AFE determines a number of values (i.e., features) representing qualities of the raw audio data 262, along with a set of those values (i.e., a feature vector or audio feature vector 228) representing features/qualities of the raw audio data 262 within each frame. A frame may be a certain period of time, for example a sliding window of 25 ms of audio data 232 taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 262, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 228 (or the raw audio data 262) may be input into a wakeword detection module 230 that is configured to detect keywords spoken in the audio. The wakeword detection module 230 may use various techniques to determine whether raw audio data 262 includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the AMD 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the AMD 104 (or separately from speech detection), the AMD 104 may use the wakeword detection module 230 to perform wakeword detection to determine when a user intends to speak a command to the AMD 104. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 230 may compare audio data 232 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN or using RNN. Following on, posterior threshold tuning, or smoothing is applied for decision making. Other techniques for wakeword detection, such as those known in the art, may also be used.

Once the wakeword is detected, circuitry or applications of the local AMD 104 may "wake" and begin transmitting audio data 232 (which may include one or more of the raw audio data 262 or the audio feature vectors 228) to one or more server(s) 194 for speech processing. The audio data 232 corresponding to audio obtained by the microphone may be processed locally on one or more of the processors 120, sent to a server 194 for routing to a recipient device, or may be sent to the server 194 for speech processing for interpretation of the included speech (either for purposes of enabling voice-communications or for purposes of executing a command in the speech). The audio data 232 may include data corresponding to the wakeword, or the portion of the audio data 232 corresponding to the wakeword may be removed by the AMD 104 before processing by the navigation module 170, before sending to the server 194, and so forth.

The speech processing module 226 may include or access an automated speech recognition (ASR) module. The ASR module may accept as input raw audio data 262, audio feature vectors 228, or other sensor data 132 and so forth and may produce as output the input data 264 comprising a text string or other data representation. The input data 264 comprising the text string or other data representation may be processed to determine the command to be executed. For example, the utterance of the command "robot, come here" may result in input data 264 comprising the text string "come here". The wakeword "robot" may be omitted from the input data 264. The input data 264 may then be provided to the navigation module 170.

The AMD 104 may move responsive to a determination made by an onboard processor 120, in response to a command received from one or more communication interfaces 204, as determined from the sensor data 132, and so forth. For example, an external server 194 may send a command that is received using the network interface 208. This command may direct the AMD 104 to proceed to find a particular user, follow a particular user, and so forth. The AMD 104 may then process this command and use the navigation module 170 to determine the directions and distances associated with carrying out the command. For example, the command to "come here" may result in the task module 180 determining the target pose 172 based on the user pose data 168, and sending a command to the navigation module 170 to move the AMD 104 to the target pose 172.

The AMD 104 may connect to the network 192 using one or more of the network interfaces 208. In some implementations, one or more of the modules or other functions described here may execute on the processors 120 of the AMD 104, on the server 194, or a combination thereof. For example, one or more servers 194 may provide various functions, such as ASR, natural language understanding (NLU), providing content such as audio or video to the AMD 104, and so forth.

The other modules 240 may provide other functionality, such as object recognition, speech synthesis, user identification, and so forth. The other modules 240 may comprise a speech synthesis module that is able to convert text data to human speech. For example, the speech synthesis module may be used by the AMD 104 to provide speech that a user is able to understand.

The data store 214 may store the other data 270 as well. For example, localization settings may indicate local preferences such as language, user identifier data may be stored that allows for identification of a particular user, and so forth. The data store 214 may also store values for various thresholds as threshold data 268.

Modules described herein may provide various processing functions such as de-noising, filtering, and so forth. Processing of sensor data 132, such as image data from a camera, may be performed by a module implementing, at least in part, one or more of the following tools or techniques. In one implementation, processing of image data may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia. In another implementation, functions available in the OKAO machine vision library as promulgated by Omron Corporation of Kyoto, Japan, may be used to process the sensor data 132. In still another implementation, functions such as those in the Machine Vision Toolbox (MVTB) available using MATLAB as developed by Math Works, Inc. of Natick, Mass., USA, may be utilized.

Techniques such as artificial neural networks (ANNs), convolutional neural networks (CNNs), active appearance models (AAMs), active shape models (ASMs), principal component analysis (PCA), cascade classifiers, and so forth, may also be used to process the sensor data 132 or other data. For example, the ANN may be trained using a supervised learning algorithm such that object identifiers are associated with images of particular objects within training images provided to the ANN. Once trained, the ANN may be provided with the sensor data 132 and produce output indicative of the object identifier.

Figure 3:
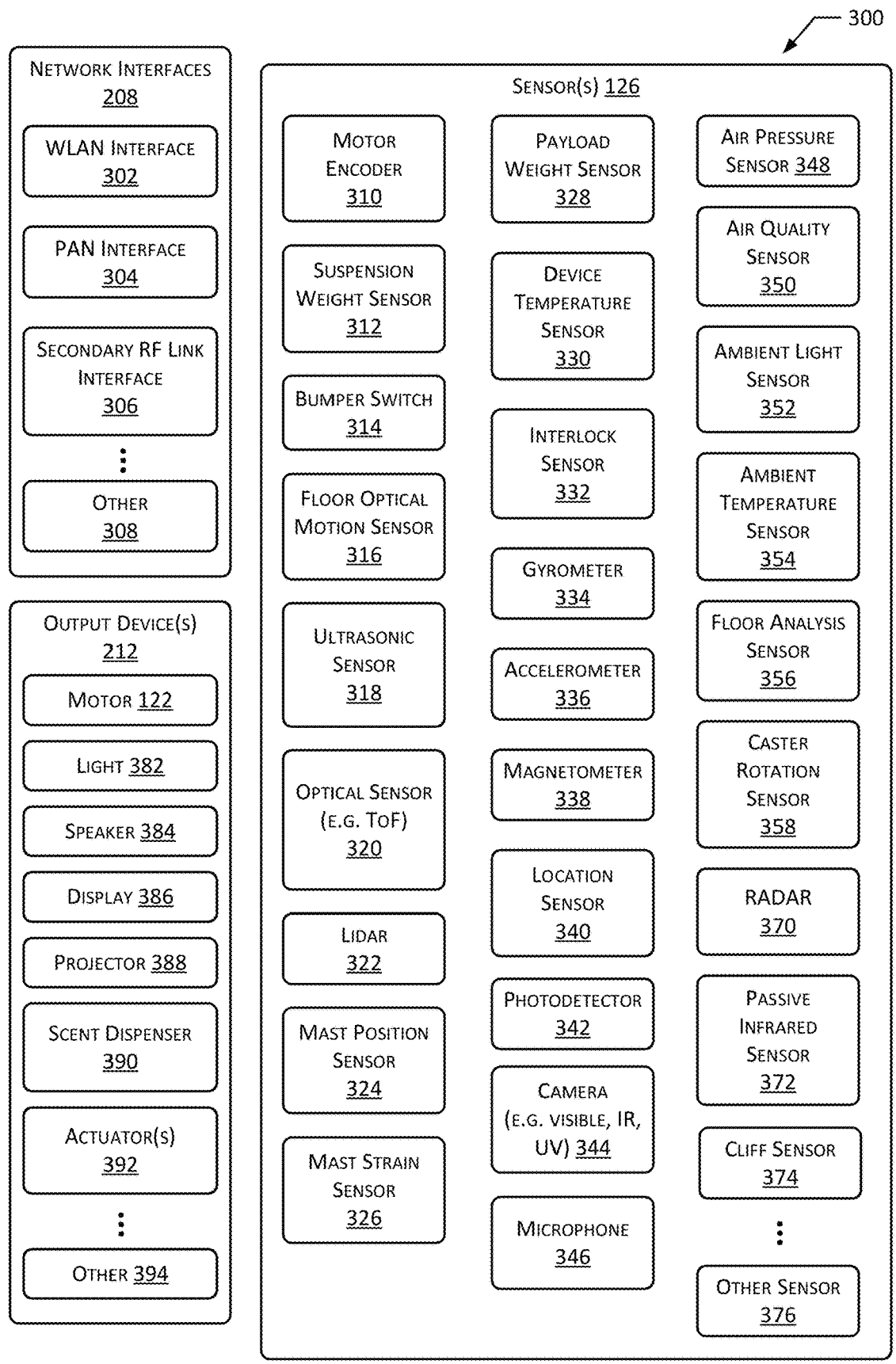
FIG. 3 is a block diagram of additional components of the AMD, according to some implementations.

FIG. 3 is a block diagram 300 of additional components of the AMD 104, according to some implementations.

The components illustrated here are provided by way of illustration and not necessarily as a limitation. For example, the AMD 104 may utilize a subset of the particular network interfaces 208, output devices 212, or sensors 126 depicted here, or may utilize components not pictured. One or more of the sensors 126, output devices 212, or a combination thereof may be included on a moveable component that may be panned, tilted, rotated, or any combination thereof with respect to a chassis of the AMD 104.

The network interfaces 208 may include one or more of a WLAN interface 302, PAN interface 304, secondary radio frequency (RF) link interface 306, or other interface 308. The WLAN interface 302 may be compliant with at least a portion of the Wi-Fi specification. For example, the WLAN interface 302 may be compliant with at least a portion of the IEEE 802.11 specification as promulgated by the Institute of Electrical and Electronics Engineers (IEEE). The PAN interface 304 may be compliant with at least a portion of one or more of the Bluetooth, wireless USB, Z-Wave, ZigBee, or other standards. For example, the PAN interface 304 may be compliant with the Bluetooth Low Energy (BLE) specification.

The secondary RF link interface 306 may comprise a radio transmitter and receiver that operate at frequencies different from or using modulation different from the other interfaces. For example, the WLAN interface 302 may utilize frequencies in the 2.4 GHz and 5 GHz Industrial Scientific and Medicine (ISM) bands, while the PAN interface 304 may utilize the 2.4 GHz ISM bands. The secondary RF link interface 306 may comprise a radio transmitter that operates in the 900 MHz ISM band, within a licensed band at another frequency, and so forth. The secondary RF link interface 306 may be utilized to provide backup communication between the AMD 104 and other devices 196 in the event that communication fails using one or more of the WLAN interface 302 or the PAN interface 304. For example, in the event the AMD 104 travels to an area within the physical space 102 that does not have Wi-Fi coverage, the AMD 104 may use the secondary RF link interface 306 to communicate with another device such as a specialized access point, dock 190, or other AMD 104.

The other 308 network interfaces may include other equipment to send or receive data using other wavelengths or phenomena. For example, the other 308 network interface may include an ultrasonic transceiver used to send data as ultrasonic sounds, a visible light system that communicates by modulating a visible light source such as a light-emitting diode, and so forth. In another example, the other 308 network interface may comprise a wireless wide area network (WWAN) interface or a wireless cellular data network interface. Continuing the example, the other 308 network interface may be compliant with at least a portion of the 4G, LTE, 5G, or other standards.

The AMD 104 may include one or more of the following sensors 126. The sensors 126 depicted here are provided by way of illustration and not necessarily as a limitation. It is understood that other sensors 126 may be included or utilized by the AMD 104, while some sensors 126 may be omitted in some configurations.

A motor encoder 310 provides information indicative of the rotation or linear extension of a motor 122. The motor 122 may comprise a rotary motor, or a linear actuator. In some implementations, the motor encoder 310 may comprise a separate assembly such as a photodiode and encoder wheel that is affixed to the motor 122. In other implementations, the motor encoder 310 may comprise circuitry configured to drive the motor 122. For example, the navigation module 170 may utilize the data from the motor encoder 310 to estimate a distance traveled.

A suspension weight sensor 312 provides information indicative of the weight of the AMD 104 on the suspension system for one or more of the wheels or the caster. For example, the suspension weight sensor 312 may comprise a switch, strain gauge, load cell, photodetector 342, or other sensing element that is used to determine whether weight is applied to a particular wheel, or whether weight has been removed from the wheel. In some implementations, the suspension weight sensor 312 may provide binary data such as a "1" value indicating that there is a weight applied to the wheel, while a "0" value indicates that there is no weight applied to the wheel. In other implementations, the suspension weight sensor 312 may provide an indication such as so many kilograms of force or newtons of force. The suspension weight sensor 312 may be affixed to one or more of the wheels or the caster. In some situations, the safety module 224 may use data from the suspension weight sensor 312 to determine whether or not to inhibit operation of one or more of the motors 122. For example, if the suspension weight sensor 312 indicates no weight on the suspension, the implication is that the AMD 104 is no longer resting on its wheels, and thus operation of the motors 122 may be inhibited. In another example, if the suspension weight sensor 312 indicates weight that exceeds a threshold value, the implication is that something heavy is resting on the AMD 104 and thus operation of the motors 122 may be inhibited. For example, the threshold value may comprise a weight of a load that compresses a suspension system to a minimum height, or results in a mass that exceeds a torque output of the motors 122 to maintain a minimum acceleration.

One or more bumper switches 314 provide an indication of physical contact between a bumper or other member that is in mechanical contact with the bumper switch 314. The safety module 224 utilizes sensor data 132 obtained by the bumper switches 314 to modify the operation of the AMD 104. For example, if the bumper switch 314 associated with a front of the AMD 104 is triggered, the safety module 224 may drive the AMD 104 backwards.

A floor optical motion sensor (FOMS) 316 provides information indicative of motion of the AMD 104 relative to the floor or other surface underneath the AMD 104. In one implementation, the FOMS 316 may comprise a light source such as light-emitting diode (LED), an array of photodiodes, and so forth. In some implementations, the FOMS 316 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the FOMS 316 may provide other information, such as data indicative of a pattern present on the floor, composition of the floor, color of the floor, and so forth. For example, the FOMS 316 may utilize an optoelectronic sensor that may detect different colors or shades of gray, and this data may be used to generate floor characterization data. The floor characterization data may be used for navigation.

An ultrasonic sensor 318 utilizes sounds in excess of 20 kHz to determine a distance from the sensor 126 to an object. The ultrasonic sensor 318 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 318 may provide information indicative of a presence of an object, distance to the object, and so forth. Two or more ultrasonic sensors 318 may be utilized in conjunction with one another to determine a location within a two-dimensional plane of the object.

In some implementations, the ultrasonic sensor 318 or a portion thereof may be used to provide other functionality. For example, the emitter of the ultrasonic sensor 318 may be used to transmit data and the detector may be used to receive data transmitted that is ultrasonic sound. In another example, the emitter of an ultrasonic sensor 318 may be set to a particular frequency and used to generate a particular waveform such as a sawtooth pattern to provide a signal that is audible to an animal, such as a dog or a cat.

An optical sensor 320 may provide sensor data 132 indicative of one or more of a presence or absence of an object, a distance to the object, or characteristics of the object. The optical sensor 320 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 320 may utilize one or more sensing elements. For example, the optical sensor 320 may comprise a 4×4 array of light sensing elements. Each individual sensing element may be associated with a field of view (FOV) that is directed in a different way. For example, the optical sensor 320 may have four light sensing elements, each associated with a different 10° FOV, allowing the sensor to have an overall FOV of 40°.

In another implementation, a structured light pattern may be provided by the optical emitter. A portion of the structured light pattern may then be detected on the object using a sensor 126 such as an image sensor or camera 344. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 320 may operate as a depth camera, providing a two-dimensional image of a scene, as well as data that indicates a distance to each pixel.

Data from the optical sensors 320 may be utilized for collision avoidance. For example, the safety module 224 and the navigation module 170 may utilize the sensor data 132 indicative of the distance to an object in order to prevent a collision with that object.

Multiple optical sensors 320 may be operated such that their FOV overlap at least partially. To minimize or eliminate interference, the optical sensors 320 may selectively control one or more of the timing, modulation, or frequency of the light emitted. For example, a first optical sensor 320 may emit light modulated at 30 kHz while a second optical sensor 320 emits light modulated at 33 kHz.

A lidar 322 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 132 may be generated that is indicative of the presence of objects and the relative positions, shapes, and so forth that are visible to the lidar 322. Data from the lidar 322 may be used by various modules. For example, the navigation module 170 may utilize point cloud data generated by the lidar 322 for localization of the AMD 104 within the physical space 102.

The AMD 104 may include a mast. A mast position sensor 324 provides information indicative of a position of the mast of the AMD 104. For example, the mast position sensor 324 may comprise limit switches associated with the mast extension mechanism that indicate whether the mast is at an extended or retracted position. In other implementations, the mast position sensor 324 may comprise an optical code on at least a portion of the mast that is then interrogated by an optical emitter and a photodetector 342 to determine the distance to which the mast is extended. In another implementation, the mast position sensor 324 may comprise an encoder wheel that is attached to a mast motor that is used to raise or lower the mast. The mast position sensor 324 may provide data to the safety module 224. For example, if the AMD 104 is preparing to move, data from the mast position sensor 324 may be checked to determine if the mast is retracted, and if not, the mast may be retracted before to beginning movement.

A mast strain sensor 326 provides information indicative of a strain on the mast with respect to the remainder of the AMD 104. For example, the mast strain sensor 326 may comprise a strain gauge or load cell that measures a side-load applied to the mast or a weight on the mast or downward pressure on the mast. The safety module 224 may utilize sensor data 132 obtained by the mast strain sensor 326. For example, if the strain applied to the mast exceeds a threshold amount, the safety module 224 may direct an audible and visible alarm to be presented by the AMD 104.

The AMD 104 may include a modular payload bay. A payload weight sensor 328 provides information indicative of the weight associated with the modular payload bay. The payload weight sensor 328 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 328 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 328 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 224 may utilize the payload weight sensor 328 to determine if the modular payload bay has been overloaded. If so, an alert or notification may be issued.

One or more device temperature sensors 330 may be utilized by the AMD 104. The device temperature sensors 330 provide temperature data of one or more components within the AMD 104. For example, a device temperature sensor 330 may indicate a temperature of one or more the batteries 124, one or more motors 122, and so forth. In the event the temperature exceeds a threshold value, the component associated with that device temperature sensor 330 may be shut down. For example, the threshold value may be determined based on component specifications, such as a maximum permissible temperature of the batteries 124.

One or more interlock sensors 332 may provide data to the safety module 224 or other circuitry that prevents the AMD 104 from operating in an unsafe condition. For example, the interlock sensors 332 may comprise switches that indicate whether an access panel is open. The interlock sensors 332 may be configured to inhibit operation of the AMD 104 until the interlock switch indicates a safe condition is present.

A gyroscope 334 may provide information indicative of rotation of an object affixed thereto. For example, a gyroscope 334 may generate sensor data 132 that is indicative of a change in orientation of the AMD 104 or a portion thereof.

An accelerometer 336 provides information indicative of a direction and magnitude of an imposed acceleration. Data such as rate of change, determination of changes in direction, speed, and so forth may be determined using the accelerometer 336. The accelerometer 336 may comprise mechanical, optical, micro-electromechanical, or other devices. For example, the gyroscope 334 in the accelerometer 336 may comprise a prepackaged solid-state inertial measurement unit (IMU) that provides multiple axis gyroscopes 334 and accelerometers 336.

A magnetometer 338 may be used to determine an orientation by measuring ambient magnetic fields, such as the terrestrial magnetic field. For example, the magnetometer 338 may comprise a Hall effect transistor that provides output compass data indicative of a magnetic heading.

The AMD 104 may include one or more location sensors 340. The location sensors 340 may comprise an optical, radio, or other navigational system such as a global positioning system (GPS) receiver. For indoor operation, the location sensors 340 may comprise indoor position systems, such as using Wi-Fi Positioning Systems (WPS). The location sensors 340 may provide information indicative of a relative location, such as "living room" or an absolute location such as particular coordinates indicative of latitude and longitude, or displacement with respect to a predefined origin.

A photodetector 342 provides sensor data 132 indicative of impinging light. For example, the photodetector 342 may provide data indicative of a color, intensity, duration, and so forth.

A camera 344 generates sensor data 132 indicative of one or more images. The camera 344 may be configured to detect light in one or more wavelengths including, but not limited to, terahertz, infrared, visible, ultraviolet, and so forth. For example, an infrared camera 344 may be sensitive to wavelengths between approximately 700 nanometers and 1 millimeter. The camera 344 may comprise charge coupled devices (CCD), complementary metal oxide semiconductor (CMOS) devices, microbolometers, and so forth. The AMD 104 may use image data determined by the camera 344 for object recognition, navigation, collision avoidance, user communication, and so forth. For example, a pair of cameras 344 sensitive to infrared light may be mounted on the front of the AMD 104 to provide binocular stereo vision, with the sensor data 132 comprising images being sent to the navigation module 170. In another example, the camera 344 may comprise a 10 megapixel or greater camera that is used for videoconferencing or for acquiring pictures for the user.

The camera 344 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 344, particularly those associated with navigation or autonomous operation, may utilize a global shutter. In other implementations, the camera(s) 344 providing images for use by the navigation module 170 may be determined using a rolling shutter and subsequently may be processed to mitigate image artifacts.

One or more microphones 346 may be configured to determine information indicative of sound present in the physical space 102. In some implementations, arrays of microphones 346 may be used. These arrays may implement beamforming techniques to provide for directionality of gain. The AMD 104 may use the one or more microphones 346 to determine information from acoustic tags, accept voice input from users, determine a direction of an utterance, determine ambient noise levels, for voice communication with another user or system, and so forth.

An air pressure sensor 348 may provide information indicative of an ambient atmospheric pressure or changes in ambient atmospheric pressure. For example, the air pressure sensor 348 may provide information indicative of changes in air pressure due to opening and closing of doors, weather events, and so forth.

An air quality sensor 350 may provide information indicative of one or more attributes of the ambient atmosphere. For example, the air quality sensor 350 may include one or more chemical sensing elements to detect the presence of carbon monoxide, carbon dioxide, ozone, and so forth. In another example, the air quality sensor 350 may comprise one or more elements to detect particulate matter in the air, such as the photoelectric detector, ionization chamber, and so forth. In another example, the air quality sensor 350 may include a hygrometer that provides information indicative of relative humidity.

An ambient light sensor 352 may comprise one or more photodetectors 342 or other light-sensitive elements that are used to determine one or more of the color, intensity, or duration of ambient lighting around the AMD 104.

An ambient temperature sensor 354 provides information indicative of the temperature of the ambient physical space 102 proximate to the AMD 104. In some implementations, an infrared temperature sensor may be utilized to determine the temperature of another object at a distance.

A floor analysis sensor 356 may include one or more components that are used to generate at least a portion of floor characterization data. In one implementation, the floor analysis sensor 356 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 356 may be used by one or more of the safety module 224, the navigation module 170, the task module 180, and so forth. For example, if the floor analysis sensor 356 determines that the floor is wet, the safety module 224 may decrease the speed of the AMD 104 and generate a notification alerting the user.

The floor analysis sensor 356 may include other components as well. For example, a coefficient of friction sensor may comprise a probe that comes into contact with the surface and determines the coefficient of friction between the probe and the floor.

A caster rotation sensor 358 provides data indicative of one or more of a direction of orientation, angular velocity, linear speed of the caster, and so forth. For example, the caster rotation sensor 358 may comprise an optical encoder and corresponding target that is able to determine that the caster transitioned from an angle of 0° at a first time to 49° at a second time.

The sensors 126 may include a radar 370. The radar 370 may be used to provide information as to a distance, lateral position, and so forth, to an object.

The sensors 126 may include a passive infrared (PIR) sensor 372. The PIR sensor 372 may be used to detect the presence of users, pets, hotspots, and so forth. For example, the PIR sensor 372 may be configured to detect infrared radiation with wavelengths between 8 and 14 micrometers.

A cliff sensor 374 may comprise an optical sensor 320. The AMD 104 may have one or more cliff sensors 374 located on a front portion of the AMD 104. For example, the cliff sensors 374 may be time-of-flight sensors that have a field of view directed downward toward a floor over which the AMD 104 is moving towards.

The AMD 104 may include other sensors 376 as well. For example, a capacitive proximity sensor may be used to provide proximity data to adjacent objects. Other sensors 376 may include radio frequency identification (RFID) readers, near field communication (NFC) systems, coded aperture cameras, and so forth. For example, NFC tags may be placed at various points within the physical space 102 to provide landmarks for the navigation module 170. One or more touch sensors may be utilized to determine contact with a user or other objects.

The AMD 104 may include one or more output devices 212. A motor 122 may be used to provide linear or rotary motion. A light 382 may be used to emit photons. A speaker 384 may be used to emit sound. A display 386 may comprise one or more of a liquid crystal display, light emitting diode display, electrophoretic display, cholesteric liquid crystal display, interferometric display, and so forth. The display 386 may be used to present visible information such as graphics, pictures, text, and so forth. In some implementations, the display 386 may comprise a touchscreen that combines a touch sensor and a display 386.

In some implementations, the AMD 104 may be equipped with a projector 388. The projector 388 may be able to project an image on a surface, such as the floor, wall, ceiling, and so forth.

A scent dispenser 390 may be used to emit one or more smells. For example, the scent dispenser 390 may comprise a plurality of different scented liquids that may be evaporated or vaporized in a controlled fashion to release predetermined amounts of each.

One or more moveable component actuators 392 may comprise an electrically operated mechanism such as one or more of a motor, solenoid, piezoelectric material, electroactive polymer, shape-memory alloy, and so forth. An actuator controller may be used to provide a signal or other input that operates one or more of the moveable component actuators 392 to produce movement of the moveable component.

In other implementations, other 394 output devices may be utilized. For example, the AMD 104 may include a haptic output device that provides output that produces particular touch sensations to the user. Continuing the example, a motor 122 with an eccentric weight may be used to create a buzz or vibration to allow the AMD 104 to simulate the purr of a cat.

Figure 4:
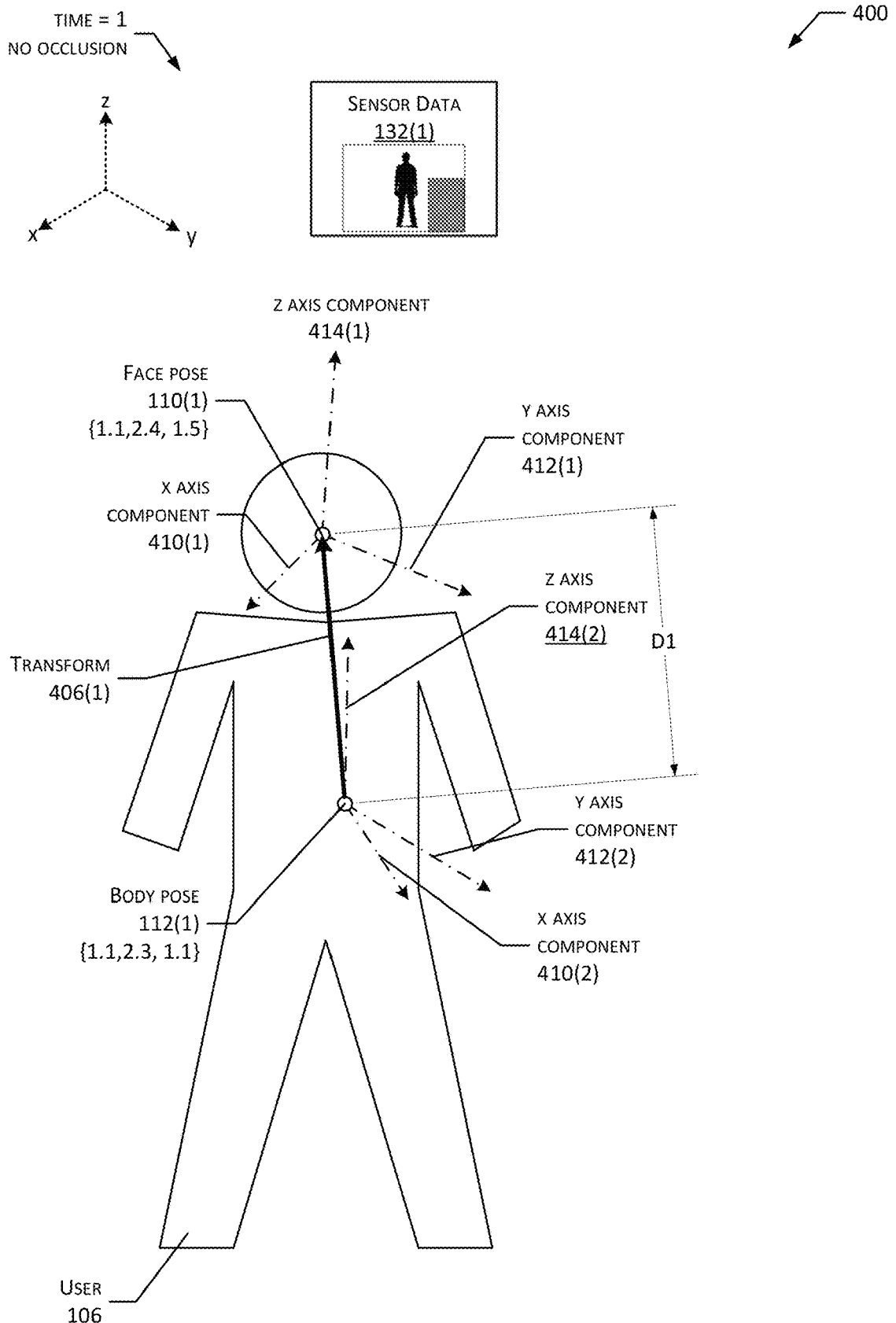
FIG. 4 illustrates a first face pose, a first body pose, and a first transform, using data associated with a first time, according to some implementations.

FIG. 4 illustrates at 400 a first face pose 110(1), a first body pose 112(1), and a first transform 406(1), using sensor data 132 associated with a first time, according to some implementations. In this illustration, there is no occlusion of the user 106 as depicted in the sensor data 132(1).

Based on the sensor data 132(1) that is associated with the first time t=1, a first face pose 110(1) is determined. The first face pose 110(1) is associated with a first location in the physical space 102 and may be indicative of one or more orientations. For example, an x axis component 410(1), a y axis component 412(1), and a z axis component 414(1) are shown, indicating the determined direction of the first face pose 110(1) for the respective axes.

Based on the sensor data 132(1) that is associated with the first time t=1, a first body pose 112(1) is determined. The first body pose 112(1) is associated with a second location in the physical space 102 and may be indicative of one or more orientations. For example, an x axis component 410(2), a y axis component 412(2), and a z axis component 414(2) are shown, indicating the determined direction of the first body pose 112(1) for the respective axes.

A first transform 406(1) is depicted. The first transform 406(1) is indicative of a spatial relationship of the first face pose 110(1) with respect to the first body pose 112(1). For example, the first transform 406(1) may be visualized as a vector with a tail originating at the second location of the first body pose 112(1) and the tip pointing at the first location of the first face pose 110(1). A distance D1 indicates the distance between the first location and the second location.

In some implementations, when the body pose 112 is determinable, the body pose data 164 indicative of the body pose 112 may be used as the user pose data 168. However, if the body pose 112 cannot be determined, or is deemed to be erroneous, an inferred body pose may be determined, as described next.

Figure 5:
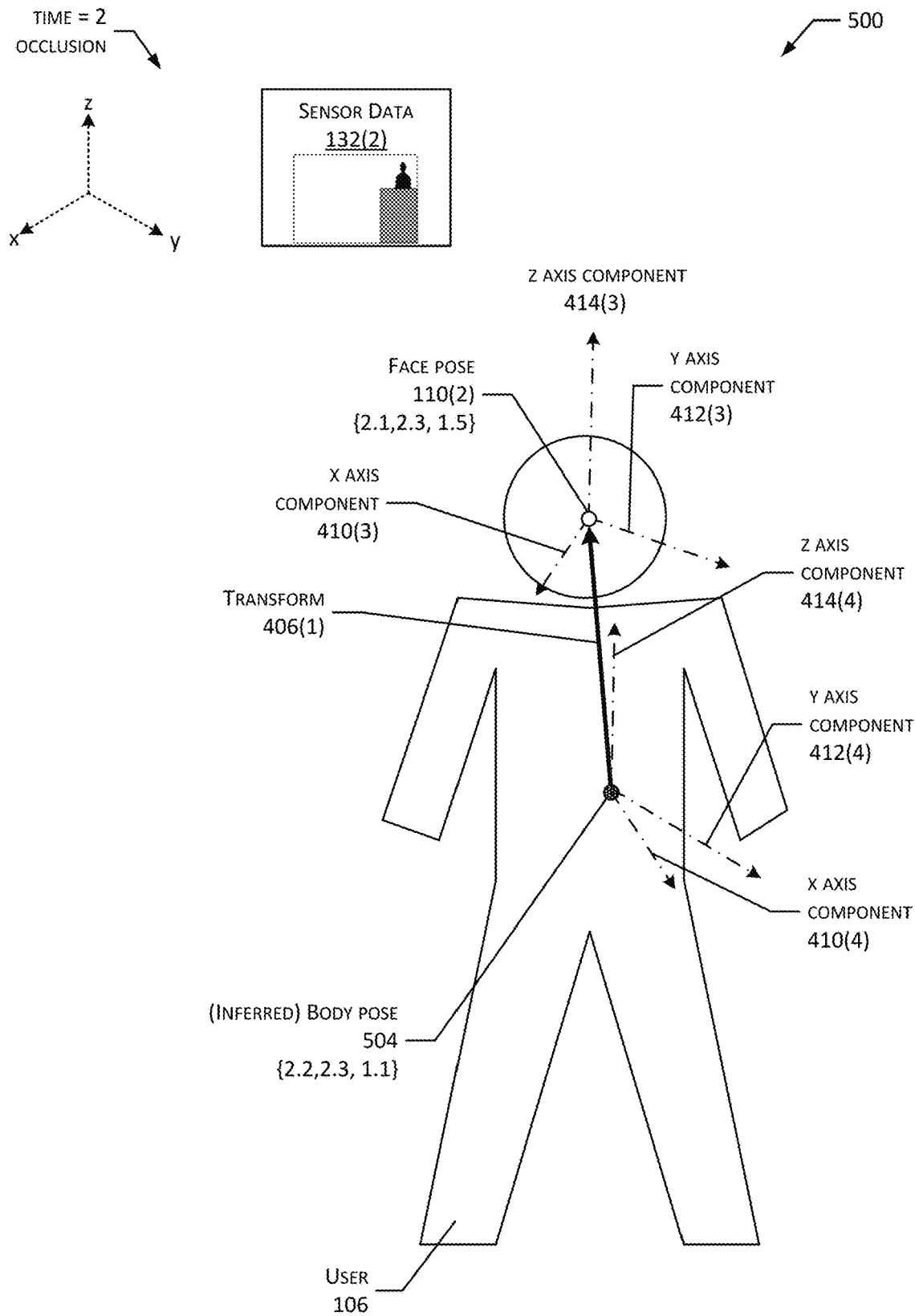
FIG. 5 illustrates a second face pose using data associated with a second time and an inferred second body pose, according to some implementations.

FIG. 5 illustrates at 500 a second face pose 110(2) using sensor data 132 associated with a second time and an inferred second body pose 504, according to some implementations. In this illustration, as depicted in the sensor data 132(2), the face of the user 106 remains visible while part of the user's 106 body is occluded.

Based on the sensor data 132(2) that is associated with the second time t=2, a second face pose 110(2) is determined. The second face pose 110(2) is associated with a third location in the physical space 102 and may be indicative of one or more orientations. For example, an x axis component 410(3), a y axis component 412(3), and a z axis component 414(3) are shown, indicating the determined direction of the second face pose 110(2) for the respective axes.

Based on the sensor data 132(2) that is associated with the second time t=2, no body pose 112 is determined. For example, due to the occlusion, a neural network processing the image may be unable to determine features associated with points on a human body, as those features are not depicted in the sensor data 132(2).

An (inferred) second body pose 504 is determined using the previously determined first transform 406(1) and the second face pose 110(2). The second face pose 110(2) may be provided as an input, and processed based on the first transform 406(1) to determine a fourth location in the physical space 102. This fourth location may be associated with the (inferred) body pose 504.

With the fourth location determined, the orientation data associated with the previous first body pose 112(1) may be used as the orientation of the (inferred) body pose 504. For example, the (inferred) body pose 504 may be determined by replacing the coordinates of the second location in the first body pose data 112(1) with the coordinates of the fourth location, leaving the orientation data unchanged. In effect, the first body pose data 112(1) is translated with respect to the axes to the fourth location, while retaining the orientation.

In other implementations, other techniques may be used to determine the (inferred) body pose 504. In one implementation, the orientation of the (inferred) body pose 504 may be an average of the orientation values between the first body pose 112(1) and the second face pose 110(2). In another implementation, if a difference between (relative to the same axis) a first orientation value of the second face pose 110(2) and a second orientation value of the first body pose 112(1) is greater than a threshold value, the first orientation value may be used in the (inferred) body pose 504.

The (inferred) body pose 504 may be represented by user pose data 168.

Figure 6:
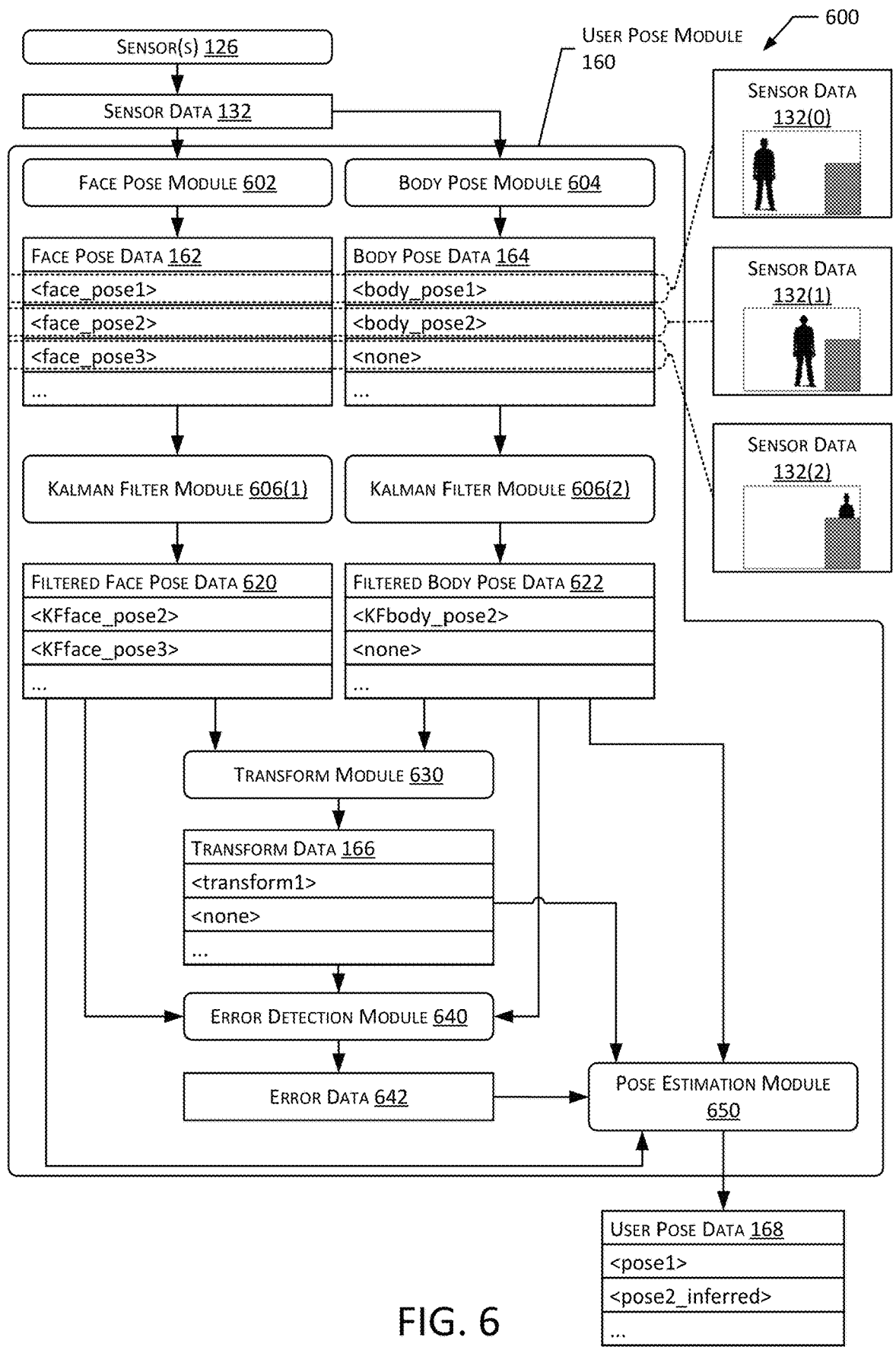
FIG. 6 is a block diagram of a user pose module, according to some implementations.

FIG. 6 is a block diagram 600 of a user pose module 160, according to some implementations. One or more sensors 126 acquire sensor data 132. For example, the one or more sensors 126 may comprise one or more of optical sensors 320, LIDAR 322, cameras 344, and so forth. In some implementations, the sensor data 132 may comprise frames, each frame representing data acquired during a particular time interval. For example, the sensor 126 may comprise a camera 344 that provides 30 individual images, or frames, of data each second during operation.

A face pose module 602 determines face pose data 162. For example, the face pose module 602 may comprise a trained neural network, classifier, or other algorithm that provides as output face pose data 162 indicative of a location and orientation, with respect to the physical space 102, of a face depicted in a given frame of sensor data 132.

A body pose module 604 determines body pose data 164. For example, the body pose module 604 may comprise a trained neural network, classifier, or other algorithm that provides as output body pose data 164 indicative of a location and orientation, with respect to the physical space 102, of a body depicted in a given frame of sensor data 132.

In some implementations, a single module may provide both the face pose data 162 and the body pose data 164. For example, a trained neural network, classifier, or other algorithm may provide as output both the face pose data 162 and the body pose data 164.

In this illustration, sensor data 132(0) associated with time t=0, sensor data 132(1) associated with time t=1, and sensor data 132(2) associated with time t=2 are shown.

The sensor data 132 (or frames thereof) are processed by the face pose module 602 and the body pose module 604. Because the face of the user is visible in all of the sensor data 132(0)-(2), the face pose module 602 has determined three face poses, illustrated in this figure as <face_pose1>, <face_pose2>, and <face_pose3>. However, the body of the user is only fully visible in sensor data 132(0)-(1), and obscured in sensor data 132(2). As a result, the body pose module 604 has determined two body poses, illustrated in this figure as <body_pose1>, <body_pose2>, and no data <none> for the sensor data 132(2).

In some implementations, the "raw" face pose data 162 determined by the face pose module 602 may be processed by a first Kalman filter module 606(1) that implements a first Kalman filter to determine filtered face pose data 620. In this figure, the filtered face pose data 620 is shown as <KFface_pose2>, <KFface_pose3>, and so forth. Use of the Kalman filter may reduce the effects of noise or uncertainty resulting from operation of the face pose module 602 and result in output that more closely corresponds to the actual pose of the user's 106 face.

Additionally, comparison of successive values of the filtered face pose data 620 may be used to determine an error condition. For example, if a first location specified by <KFface_pose2> is greater than a threshold distance from a second location specified by the <KFface_pose3>, an error condition may be determined. In other implementations, other metrics may be used, such as a percentage change, and so forth. Responsive to the error condition, mitigating actions may be taken. For example, the filtered face pose data 620 may be discarded and an error returned.

In some implementations, the "raw" body pose data 164 determined by the body pose module 604 may be processed by a second Kalman filter module 606(2) that implements a second Kalman filter to determine filtered body pose data 622. In this figure, the filtered body pose data 622 is shown as <KFbody_pose2>.

Additionally, comparison of successive values of the filtered body pose data 622 may be used to determine an error condition. For example, if a third location specified by <KFbody_pose3> is greater than a threshold distance from a second location specified by the <KFbody_pose2>, an error condition may be determined. In other implementations, other metrics may be used, such a percentage change, and so forth. Responsive to the error condition, mitigating actions may be taken. For example, the filtered body pose data 622 may be discarded and an error returned.

The filtered face pose data 620 and the filtered body pose data 622 associated with the same time are provided as input to a transform module 630. The transform module 630 determines the transform data 166. The transform data 166 describes a spatial relationship between the location of the body pose 112 and the location of the face pose 110. In one implementation, the transform module 630 may use a transform tree, with filtered face pose data 620 as a first node in the tree and filtered body pose data 622 as a second node in the tree. In another implementation, the transform module 630 may use the transform data 166 by determining a first vector associated with the filtered face pose data 620, a second vector associated with the filtered body pose data 622, and subtracting the first vector from the second vector. In other implementations, other techniques may be used.

In some implementations, the transform module 630 may determine another representation of the user 106. For example, a transform tree comprising a representation, such as a skeleton, of at least a portion of the head, arms, torso, and legs may be determined and maintained. The transform tree may impose constraints such as biomechanical limits including an expected maximum range of motion at a joint, maximum expected distance between points, and so forth. In some implementations, the transform data 166 may be determined relative to one or more points of the skeleton. For example, the body pose 112 may be specified based on the locations of a left shoulder joint, right shoulder joint, left leg joint, and right leg joint.

An error detection module 640 may be used to determine error data 642 indicative of an error condition. An error condition may be deemed to occur if inputs are deemed to be inconsistent, erroneous, physically impossible, and so forth. The error data 642, if any, may be provided to a pose estimation module 650.

The error detection module 640 may determine error data 642 indicative of an error if one or more of the face pose module 602 or the body pose module 604 reports an error, or provides output with a confidence value less than a threshold value. For example, if the confidence value for <face_pose2> is less than a threshold value of 0.8, an error may be deemed to occur.

The error detection module 640 may determine error data 642 indicative of an error if one or more of filtered pose data is missing for the same time. For example, if the filtered face pose data 620 and the filtered body pose data 622 for the same frame of sensor data 132 both have values of "<none>", an error may be deemed to occur.

The error detection module 640 may determine error data 642 indicative of an error if a distance between a face pose 110 and a body pose 112 exceeds a threshold value. In some implementations, the threshold value may be specified based on anatomical values. For example, if the distance D1 as shown in FIG. 4 is greater than a threshold value of 2 meters, an error may be deemed to occur.

The error detection module 640 may determine error data 642 indicative of an error if a variance between successive values of one or more of the filtered face pose data 620 or the filtered body pose data 622 exceed a threshold value. The threshold value may be specified based on physical limits, such as a maximum expected speed of a user 106 or portion thereof. For example, if the distance between a first location indicated by <KFface_pose2> and a second location indicated by <KFface_pose3> is greater than 50 cm, an error may be deemed to occur.

In some implementations, the error detection module 640 may determine an error for one or more poses or points associated with the user 106 as represented by the transform module 630. For example, if a second point associated with a left shoulder of the user 106 at a second time is greater than a threshold distance from a first point of that left shoulder at an earlier first time, the second point may be disregarded and replaced with an inferred point, as discussed herein.

The pose estimation module 650 determines user pose data 168. In the event that filtered body pose data 622 associated with a particular time is available, the filtered body pose data 622 may be used as the user pose data 168.

In the event that filtered body pose data 622 is unavailable, such as due to occlusion of the user 106, the filtered face pose data 620 and the transform data 166 from an earlier time may be used to determine a location in the physical space 102 of an (inferred) body pose 504. Once the location of the (inferred) body pose 504 has been determined, the orientation data associated with earlier body pose data 164 may be re-used to determine the (inferred) body pose data 164. This (inferred) body pose data 164 may then be used as the user pose data 168. The process is discussed in more detail with regard to FIG. 7.

In other implementations, other filters or techniques may be used. For example, dynamic data reconciliation, statistical analysis, and so forth may be used to determine filtered data. In another implementations, the Kalman filter modules 606 may be omitted. In which case, the face pose data 162 is processed as described herein in place of the filtered face pose data 620, and the body pose data 164 is processed as described herein in place of the filtered body pose data 622.

Figure 7:
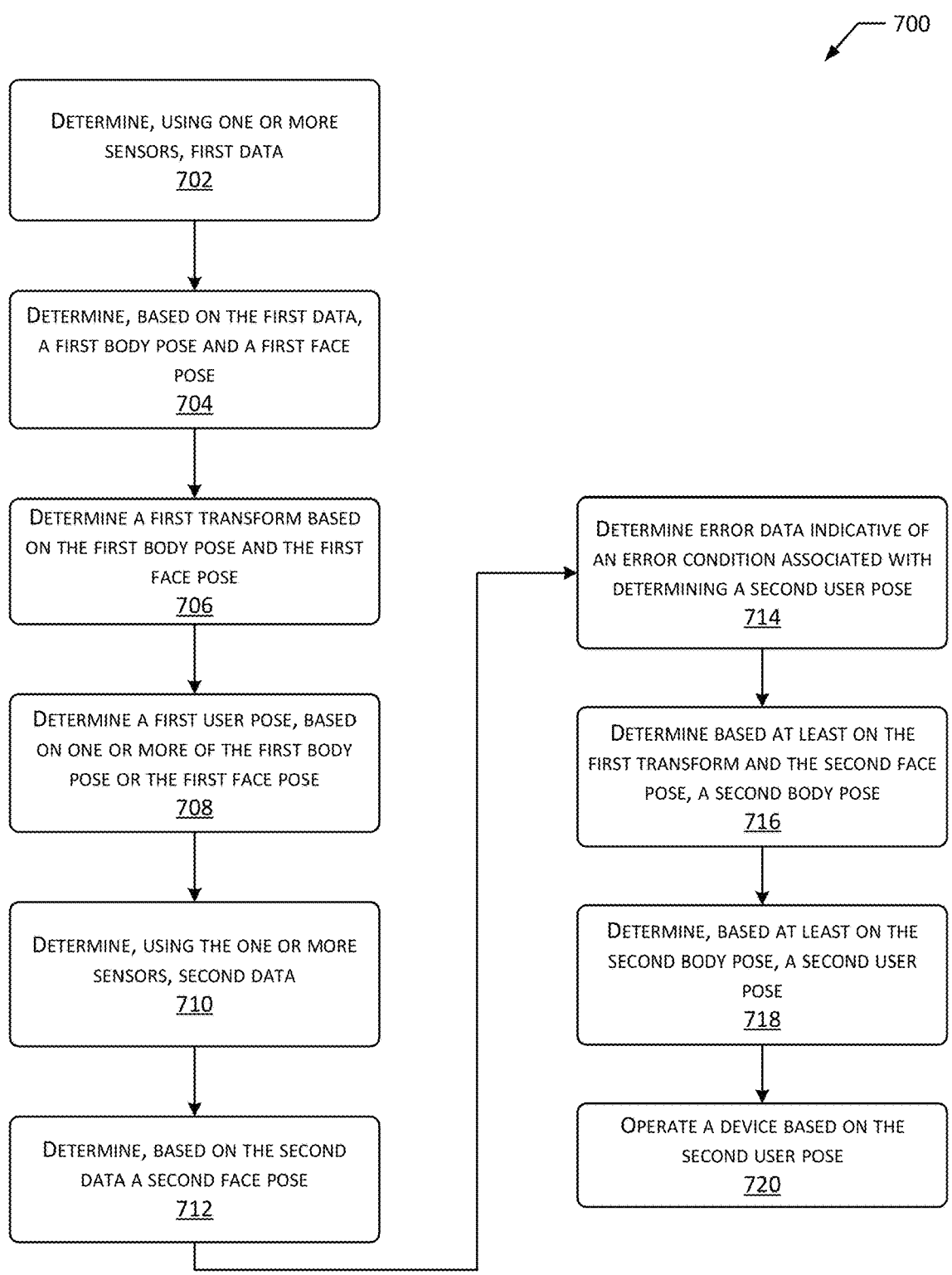
FIG. 7 is a flow diagram of a process to determine a user pose, according to some implementations.

FIG. 7 is a flow diagram 700 of a process to determine a user pose 114, according to some implementations. The process may be implemented at least in part by one or more of the processors 120.

At 702, using one or more sensors 126, first data is determined that is associated with a first time. For example, the camera 344 may acquire sensor data 132(1) comprising a first frame of image data at time t=1.

At 704, based on the first data, a first body pose 112(1) and a first face pose 110(1) are determined. For example, the sensor data 132(1) is processed by the body pose module 604 to determine body pose data 164(1). The body pose data 164(1) is then processed by a second Kalman filter module 606(2) to determine filtered body pose data 622(1). Continuing the example, the sensor data 132(1) is processed by the face pose module 602 to determine face pose data 162(1). The face pose data 162(1) is then processed by a first Kalman filter module 606(1) to determine filtered face pose data 620(1).

At 706 a first transform 406 is determined based on the first body pose 112(1) and the first face pose 110(1). For example, the body pose data 164(1) and the face pose data 162(1) are processed by the transform module 630 to determine first transform data 166 indicative of a first transform.

At 708 a first user pose 114(1) is determined based on one or more of the first body pose 112(1) or the first face pose 110(1). For example, given no error indicated by the error data 642 associated with the data of time t=1, the pose estimation module 650 may use the first filtered body pose data 622(1) as the first user pose data 168(1).

At 710, using one or more sensors 126, second data is determined that is associated with a second time. For example, the camera 344 may acquire sensor data 132(2) comprising a second frame of image data at time t=2.

At 712, based on the second data, a second face pose 110(2) is determined. For example, the sensor data 132(2) is processed by the face pose module 602 to determine face pose data 162(2). The face pose data 162(2) is then processed by the first Kalman filter module 606(1) to determine filtered face pose data 620(2).

At 714 error data 642 is determined that is indicative of an error condition associated with the second time and the determining a second user pose 114(2). For example, there may be no body pose data 164 available from the body pose module 604 at the second time, due to occlusion or the body of the user 106 or not otherwise being depicted in the second sensor data 132(2).

At 716 a second body pose 112(2) is determined based at least in part on the first transform 406 and the second face pose 110(2). For example, the pose estimation module 650 may use the filtered face pose data 620 and the first transform data 166 to determine an inferred location of the body pose 112 at the second time. The previously determined first filtered body pose data 622(1), with the coordinates of the location in the physical space 102 updated to the inferred location, may be used to determine the inferred second body pose data 164(2).

In one implementation, the determination of the second body pose 112(2) using the inferred body pose 504 is responsive to the error data 642 indicating an error condition.

At 718, based at least in part on the second body pose 112(2), a second user pose 114(2) is determined. For example, the inferred body pose data 164 may be used as the user pose data 168(2) associated with the second time.

At 720 a device such as the AMD 104 is operated based on the second user pose 114(2). The operation may cause the device to one or more of present visual output on a display device 386, present audible output using a speaker 384, move a display device 386, operate one or more actuators, move a manipulator arm, move the device to a target pose 172, wherein the target pose is based on the user pose data 168(2), or other actions.

For example, the AMD 104 may use the user pose data 168(2) to determine a target pose 172. The target pose 172 may be determined based on the task to be completed. For example, if the AMD 104 is to present information to the user 106, it may move to a target pose 172 in front of and facing the user 106. In another example, if the AMD 104 is to follow the user 106, it may move to a target pose 172 behind and facing the user 106. The target pose 172 may then be provided to the navigation module 170 that determines and implements path plan data 266 to autonomously move the AMD 104 to the target pose 172.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

In other implementations, other types of autonomous mobile devices (AMDs) may use the systems and techniques described herein. For example, the AMD 104 may comprise an autonomous ground vehicle that is moving on a street, an autonomous aerial vehicle in the air, autonomous marine vehicle, and so forth.

What is claimed is:

1. An autonomous mobile device (AMD) comprising:
one or more sensors that acquire data about a physical space;
one or more memories storing computer-executable instructions; and
one or more processors to execute the computer-executable instructions to:
determine first data using the one or more sensors at a first time;
determine, based on the first data:
a first body pose, with respect to the physical space, of a body of a user, and
a first face pose, with respect to the physical space, of a face of the user;
determine, based on the first body pose and the first face pose, a first transform;
determine second data using the one or more sensors at a second time;
determine, based on the second data:
a second face pose, with respect to the physical space, of the face of the user;
determine, based on the first transform and the second face pose, a second body pose of the body of the user; and
operate the AMD based on the second body pose.

2. The AMD of claim 1, wherein the first data comprises a first image, and the second data comprises a second image; and
wherein the one or more processors further execute the computer-executable instructions to:
process the first image using a first neural network to determine the first body pose;
process the first image using a second neural network to determine the first face pose;
process the second image using the first neural network to determine the second face pose; and
determine that no body pose is depicted in the second image; and
further wherein the instructions to determine the second body pose are executed responsive to no body pose being depicted in the second image.

3. The AMD of claim 1, wherein the one or more processors further execute the computer-executable instructions to:
determine the first body pose using a first Kalman filter;
determine the first face pose using a second Kalman filter; and
determine the second face pose using the second Kalman filter.

4. The AMD of claim 1, wherein the second face pose is associated with a first location, the first body pose is associated with a second location, and the one or more processors further execute the computer-executable instructions to:
determine, based on the second data, a third body pose, with respect to the physical space, of the body of the user, the third body pose being associated with a third location; and
determine error data indicative of an error condition, based on one or more of:
a first distance between the third location and the first location is greater than a first threshold distance, or
a second distance between the third location and the second location is greater than a second threshold distance; and
wherein the instructions to determine the second body pose are executed responsive to the error data.

5. The AMD of claim 1, wherein:
the first body pose is indicative of a first orientation;
the second body pose is indicative of a second orientation; and
the second orientation is the same as the first orientation, and further wherein the second orientation and the first orientation are each indicative of an angle, relative to a reference direction, within a horizontal plane.

6. The AMD of claim 1, wherein the instructions to operate the AMD based on the second body pose comprise instructions to:
determine, based on the second body pose, a target pose that is in front of the user; and
move the AMD to the target pose.

7. A method comprising:
determining first data using one or more sensors;
determining, based on the first data:
a first body pose of a body of a user, and
a first face pose of a face of the user;
determining, based on the first body pose and the first face pose, a first transform;

determining second data using the one or more sensors;
determining, based on the second data, a second face pose of the face of the user;
determining, based on the first transform and the second face pose, a second body pose; and
operating a device based on the second body pose.

8. The method of claim 7, wherein:
the determining the first body pose uses a first Kalman filter;
the determining the first face pose uses a second Kalman filter; and
the determining the second face pose uses the second Kalman filter.

9. The method of claim 7, further comprising:
determining, based on the second data:
a third body pose of the body of the user; and
determining a first distance between a first location specified by the third body pose and a second location specified by the second face pose;
wherein the determining the second body pose is responsive to the first distance being greater than a threshold value.

10. The method of claim 7, wherein a first orientation associated with the second body pose is equal to a second orientation associated with the first body pose, and further wherein the first orientation and the second orientation are each indicative of a relative angle between a reference direction in a physical space.

11. The method of claim 7, wherein the determining the second body pose is further based on a first orientation associated with the first body pose and a second orientation associated with the second face pose.

12. The method of claim 7, wherein:
the determining the first face pose uses a first Kalman filter, wherein the first face pose is indicative of a first location in a physical space; and
the determining the second face pose uses the first Kalman filter, wherein the second face pose is indicative of a second location in the physical space; and
the method further comprising:
determining a first distance between the first location and the second location;
wherein the determining the second body pose is responsive to the first distance being greater than a threshold value.

13. The method of claim 7, the operating the device based on the second body pose causes the device to perform one or more of:
presenting visual output on a display device,
presenting audible output using a speaker,
moving a display device, or
moving the device to a target pose, wherein the target pose is based on the second body pose.

14. A system comprising:
one or more sensors that acquire data about a physical space;
one or more memories storing computer-executable instructions; and
one or more processors to execute the computer-executable instructions to:
determine first data using the one or more sensors;
determine, based on the first data:
a first body pose of a body of a user, and
a first face pose of a face of the user;
determine, based on the first body pose and the first face pose, a first transform;
determine second data using the one or more sensors;
determine, based on the second data:
a second face pose of the face of the user;
determine, based at least on the first transform and the second face pose, a second body pose; and
operate a device based at least in part on the second body pose.

15. The system of claim 14, wherein the first data comprises a first image, and the second data comprises a second image; and further wherein the one or more processors further execute the computer-executable instructions to:
process the first image using a first neural network to determine the first body pose;
process the second image using a second neural network to determine error data indicative of one or more of:
no body pose is depicted in the second image, or
a confidence value associated with a third body pose depicted in the second image is less than a threshold value; and
further wherein the instructions to determine the second body pose are executed responsive to the error data.

16. The system of claim 14, wherein the one or more processors further execute the computer-executable instructions to:
determine the first body pose using a first Kalman filter;
determine the first face pose using a second Kalman filter; and
determine the second face pose using the second Kalman filter.

17. The system of claim 14, wherein the one or more processors further execute the computer-executable instructions to:
determine, based on the second data, a third body pose of the body of the user; and
determine error data, based on one or more of:
a first distance between a first location specified by the third body pose and a second location specified by the second face pose is greater than a first threshold distance, or
a second distance between the first location and a third location specified by the first body pose is greater than a second threshold distance; and
further wherein the instructions to determine the second body pose are executed responsive to the error data.

18. The system of claim 14, wherein a first orientation associated with the second body pose is equal to a second orientation associated with the first body pose, and further wherein the first orientation and the second orientation are each indicative of a relative angle between a reference direction in a physical space.

19. The system of claim 14, wherein the second body pose is further based on a first orientation associated with the first body pose and a second orientation associated with the second face pose.

20. The system of claim 14, wherein the instructions to operate the device based on the second body pose cause the device to one or more of:
present visual output on a display device,
present audible output using a speaker,
move the display device, or
move the device to a target pose, wherein the target pose is based on the second body pose.

* * * * *